US012738120B2

(12) United States Patent
Kim et al.

(10) Patent No.: US 12,738,120 B2
(45) Date of Patent: Sep. 15, 2026

(54) CASSETTE FOR AUTOMATED TELLER MACHINE

(71) Applicant: HYOSUNG TNS INC., Seoul (KR)

(72) Inventors: Seok Won Kim, Seoul (KR); Dong Won Min, Seoul (KR); Tai Woo Lee, Seoul (KR); Ji Hoon Woo, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 29 days.

(21) Appl. No.: 18/894,271

(22) Filed: Sep. 24, 2024

(65) Prior Publication Data

US 2025/0308311 A1 Oct. 2, 2025

(30) Foreign Application Priority Data

Apr. 2, 2024 (KR) ........................ 10-2024-0044836

(51) Int. Cl.
*G07D 11/13* (2019.01)

(52) U.S. Cl.
CPC ......... *G07D 11/13* (2019.01); *G07D 2211/00* (2013.01)

(58) Field of Classification Search
CPC ......... B65H 29/22; B65H 31/06; G07D 11/13
See application file for complete search history.

(56) References Cited

U.S. PATENT DOCUMENTS 4,753,431 A * 6/1988 Fujimoto ............. B65H 83/025 271/111
6,889,897 B2 * 5/2005 Nomiyama ............ G07D 11/13 902/8
8,459,636 B2 * 6/2013 Moulin .................. B65H 31/06 271/181
8,485,432 B2 * 7/2013 Holland-Letz ......... B65H 1/022 235/383
9,633,501 B2 * 4/2017 Mitsuyama ............ G07D 11/10
11,113,920 B2 * 9/2021 Qu ......................... B65H 29/00

FOREIGN PATENT DOCUMENTS

EP 1326215 A2 * 7/2003 ............. G07D 11/25
KR 20100126191 A * 12/2010 ............. G07D 11/16
KR 20210061551 A * 5/2021 ............. G07D 11/13
WO WO-2015005035 A1 * 1/2015 ............. B65H 31/06
WO WO-2018192336 A1 * 10/2018 ............... B65H 3/06

* cited by examiner

*Primary Examiner* — Patrick Cicchino
(74) *Attorney, Agent, or Firm* — BACON & THOMAS, PLLC

(57) ABSTRACT

A cassette for an automated teller machine includes: a case providing an accommodation space for a medium; a front plate rotatably disposed in the case to guide the medium into the accommodation space, the front plate having a front groove; a push plate disposed horizontally movable in the accommodation space toward or away from the front plate; and a stack wheel rotatably disposed on the front plate so that at least a portion thereof selectively protrudes from the front groove. When the medium is stacked in the accommodation space, the stack wheel rotates to protrude from the front groove.

8 Claims, 9 Drawing Sheets

CASSETTE FOR AUTOMATED TELLER MACHINE

TECHNICAL FIELD

The present disclosure relates to a cassette for an automated teller machine.

BACKGROUND

In general, an automated teller machine is a device installed in a place other than a financial institution's counter, allowing customers to conveniently use various financial services regardless of time and place, and can provide various financial services such as cash deposits and withdrawals, account transfers, balance inquiries, and passbook updates.

A cassette capable of storing mediums such as cash or checks may be provided inside an automated teller machine. The medium stored in the cassette may be taken out from the cassette upon a customer's withdrawal request, and new medium may be loaded into the cassette upon a customer's deposit request. The cassette may be disposed vertically or horizontally within the automated teller machine. When the cassette is disposed vertically within the automated teller machine, the medium is fed in from the upper side of the cassette, so the medium can be stably stacked in the space between a front plate and a push plate without being crumpled.

However, when the cassette is disposed horizontally inside the automated teller machine, the medium is fed from a lower side to an upper side of the cassette in the horizontal direction of the automated teller machine, so there is a problem that the medium may be stacked in the space between the front plate and the push plate of the cassette in a crumpled or bulged state. The medium stacked in the space between the front plate and the push plate in a crumpled state may obstruct the stacking of additional medium.

SUMMARY

In view of the above, the present disclosure provides a cassette for an automated teller machine, which allows mediums to be stacked without crumpling when being stacked horizontally.

In accordance with an embodiment of the present disclosure, there is provided a cassette for an automated teller machine, including: a case providing an accommodation space for a medium; a front plate rotatably disposed in the case to guide the medium into the accommodation space, the front plate having a front groove; a push plate disposed horizontally movable in the accommodation space toward or away from the front plate; and a stack wheel rotatably disposed on the front plate so that at least a portion thereof selectively protrudes from the front groove, wherein when the medium is stacked in the accommodation space, the stack wheel rotates to protrude from the front groove.

The stack wheel may be rotated to retract from the push plate when the medium is removed from the accommodation space.

The stack wheel may provide a stack space for stack of the medium between the front plate and the push plate when at least a portion of the stack wheel protrudes from the front groove by rotation.

The cassette may further include a sheet roller rotatably disposed in the case to guide the medium into the accommodation space, and the stack wheel may be drivingly connected to the sheet roller to operate in conjunction with an operation of the sheet roller.

A rotation shaft of the stack wheel may be drivingly connected to a rotation shaft of the sheet roller so that when the sheet roller rotates in one direction, the stack wheel may rotate in a direction opposite to the rotation direction of the sheet roller.

The stack wheel may include: a wheel shaft portion disposed on the front plate to be rotatable in the front groove; and a plurality of wheel push portions protruding from an outer circumferential surface of the wheel shaft portion, the wheel push portions being spaced apart at regular intervals in a circumferential direction on the outer circumferential surface of the wheel shaft portion.

The cassette may further include a detection sensor for detecting a separation pressure applied by a pickup roller on the medium when the medium is to be removed from the accommodation space.

The cassette may further include a moving assembly for horizontally moving the push plate; and a power transmission assembly for transmitting a driving force of the moving assembly to the stack wheel when the push plate presses the front plate.

The moving assembly may include: a moving gear disposed in a side portion of the case to be engaged with a driving gear disposed in the automated teller machine when the cassette is mounted in the automated teller machine; a moving shaft drivingly connected to the moving gear to receive driving force from the moving gear; a main driving belt that transmits driving force of the moving shaft to the push plate to allow the push plate to move horizontally; and a sub driving belt that transmits the driving force of the moving shaft to the power transmission assembly.

The front plate may be provided with a front gear that is selectively and drivingly connected to the power transmission assembly when the push plate presses the front plate.

The power transmission assembly may include: a main power transmission gear drivingly connected to the sub driving belt; and a sub power transmission gear drivingly connected to the main power transmission gear and selectively engageable with the front gear, and when engaged with the front gear, the sub power transmission gear rotates the front plate to move faster than the push plate to provide a separation space for separation of the medium between the front plate and the push plate.

According to embodiments of the present disclosure, it is possible to prevent mediums from being stacked in a bulged or crumpled state by forming a stack space between the front plate and the push plate of the cassette when mediums are stacked horizontally, which ultimately enables the mediums to be stably stacked within the cassette.

DETAILED DESCRIPTION

A preferred embodiment of the present disclosure for implementing the spirit of the present disclosure will be described in more detail with reference to the accompanying drawings.

However, in describing the present disclosure, detailed descriptions of known configurations or functions may be omitted to clarify the present disclosure.

When an element is referred to as being 'connected' to, or 'supplied' to another element, it should be understood that the element may be directly connected to, or supplied to the other element, but that other elements may exist in the middle.

The terms used in the present disclosure are only used for describing specific embodiments, and are not intended to limit the present disclosure. Singular expressions include plural expressions unless the context clearly indicates otherwise.

Further, some components are exaggerated, omitted, or schematically illustrated in the accompanying drawings, and the size of each component does not fully reflect the actual size.

In the present specification, it is to be understood that the terms such as "including" are intended to indicate the existence of the certain features, areas, integers, steps, actions, elements and/or combinations thereof disclosed in the specification, and are not intended to preclude the possibility that one or more other certain features, areas, integers, steps, actions, elements and/or combinations thereof may exist or may be added.

Hereinafter, an automated teller machine according to one embodiment of the present disclosure will be specifically described.

Figure 1:
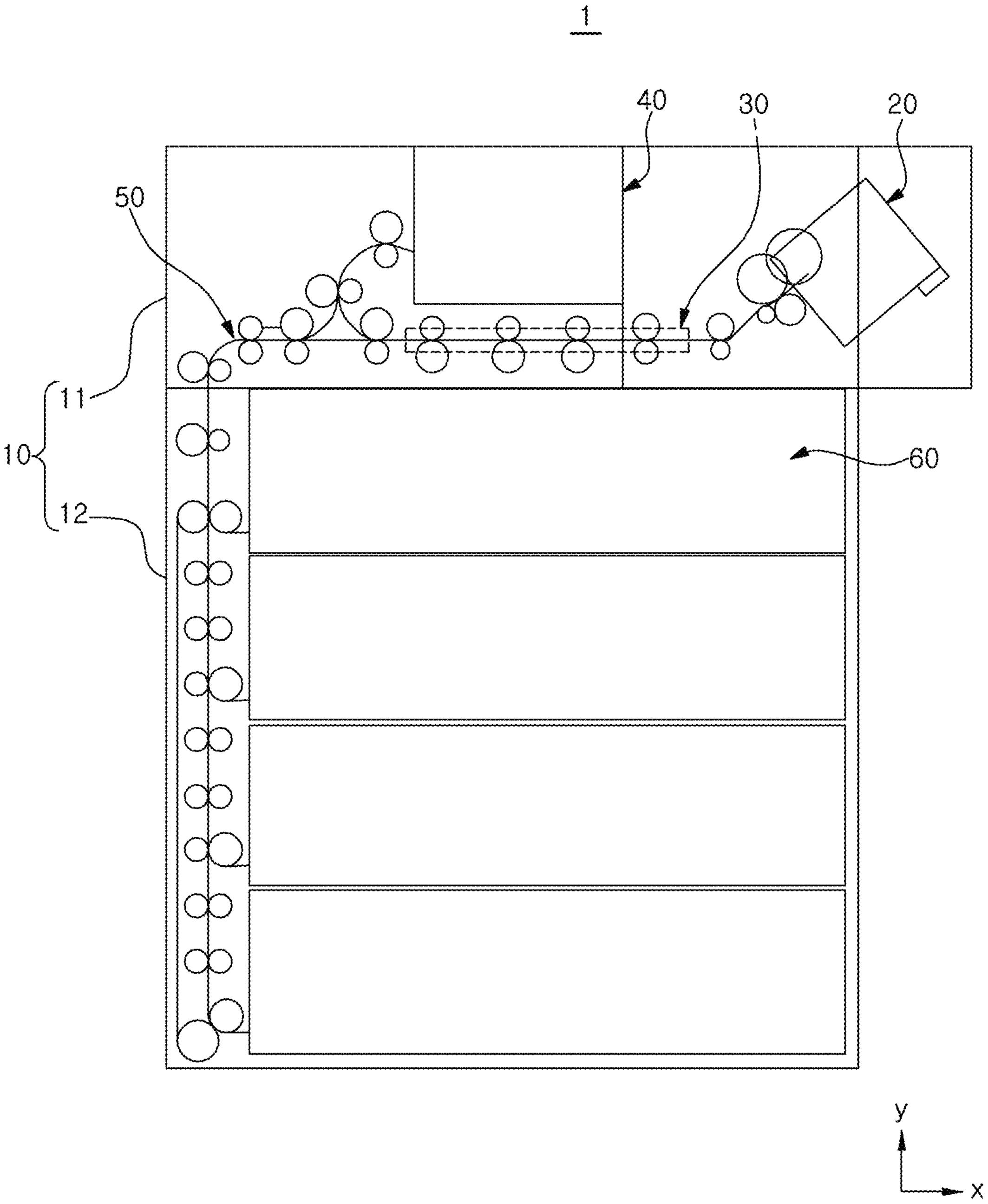
FIG. 1 is a schematic diagram showing an automated teller machine according to one embodiment of the present disclosure.
Figure 2:
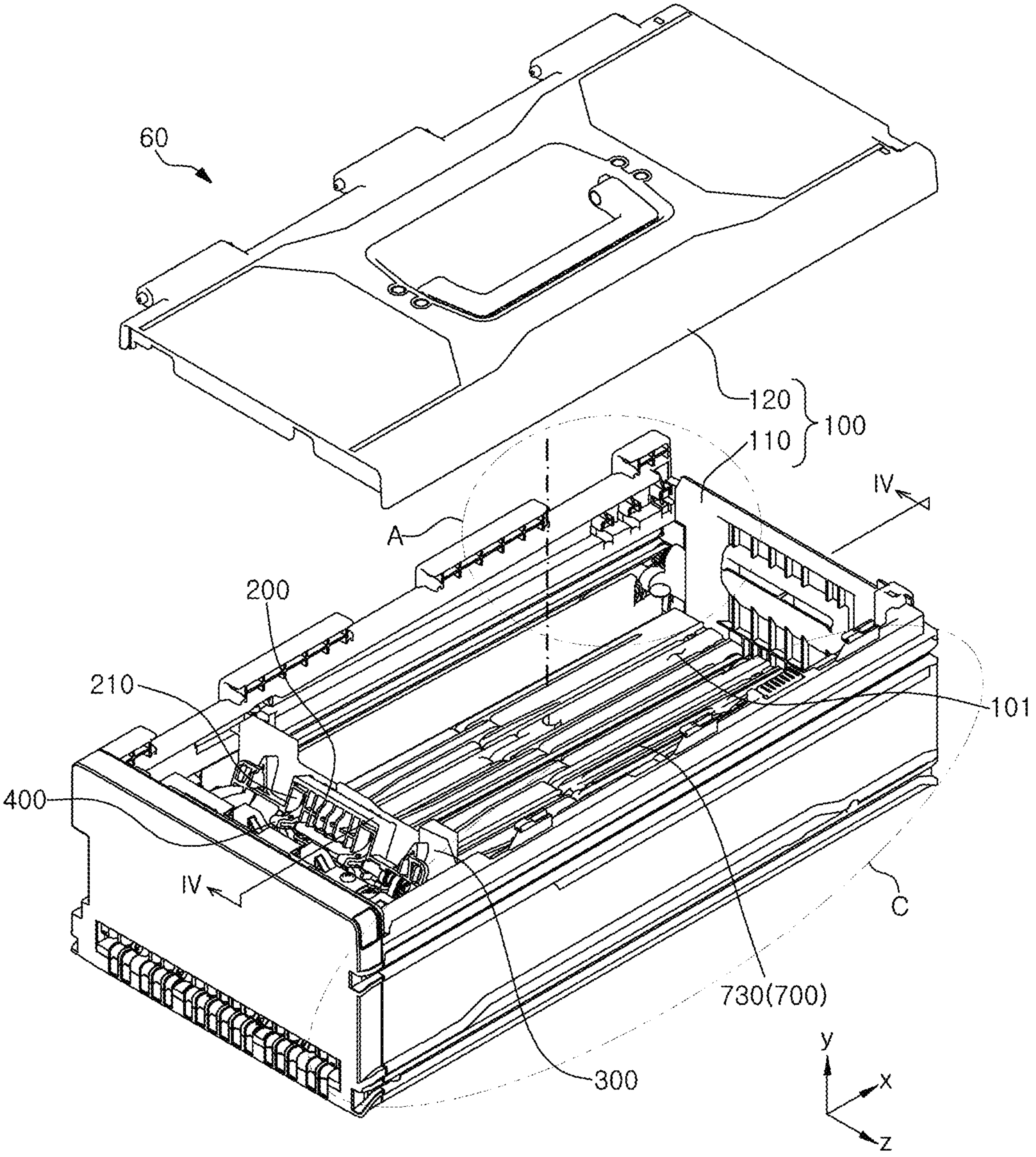
FIG. 2 is an exploded perspective view showing a cassette for the automated teller machine according to one embodiment of the present disclosure.
Figure 3:
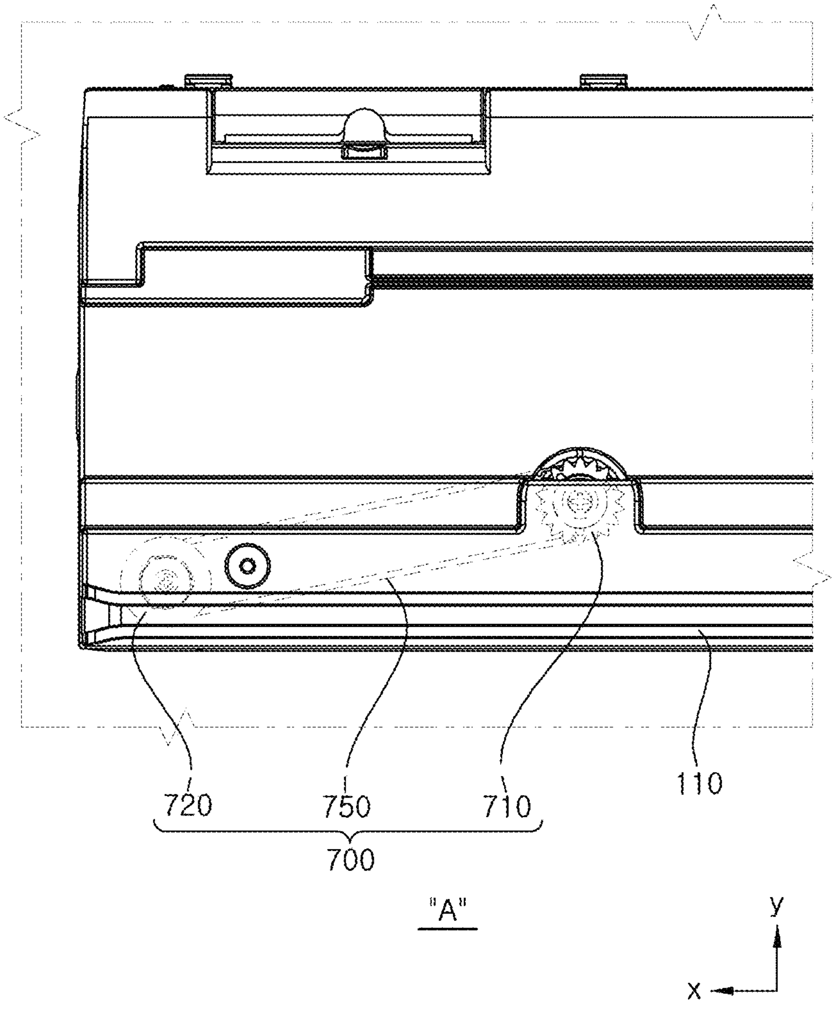
FIG. 3 is an enlarged side view of part "A" of FIG. 2.
Figure 4:
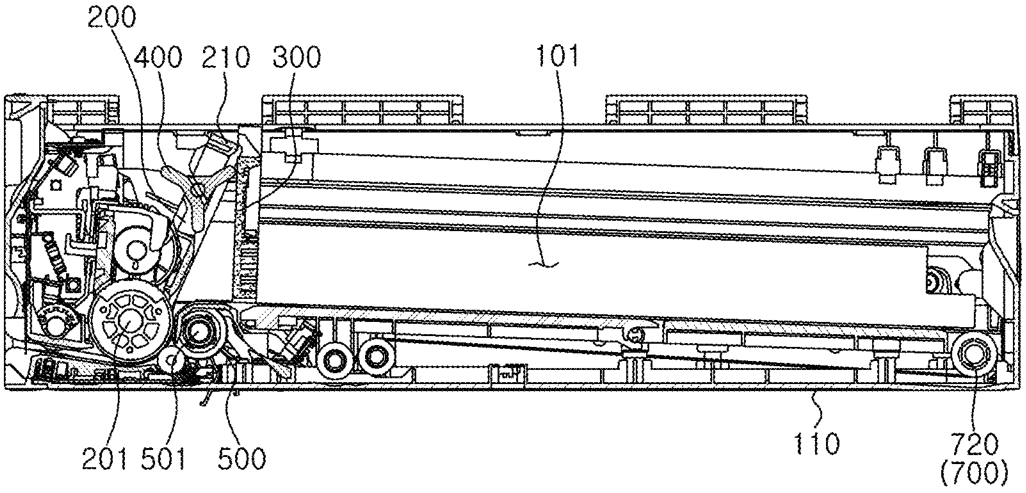
FIG. 4 is a cross-sectional side view taken along line IV-IV of FIG. 2.
Figure 5:
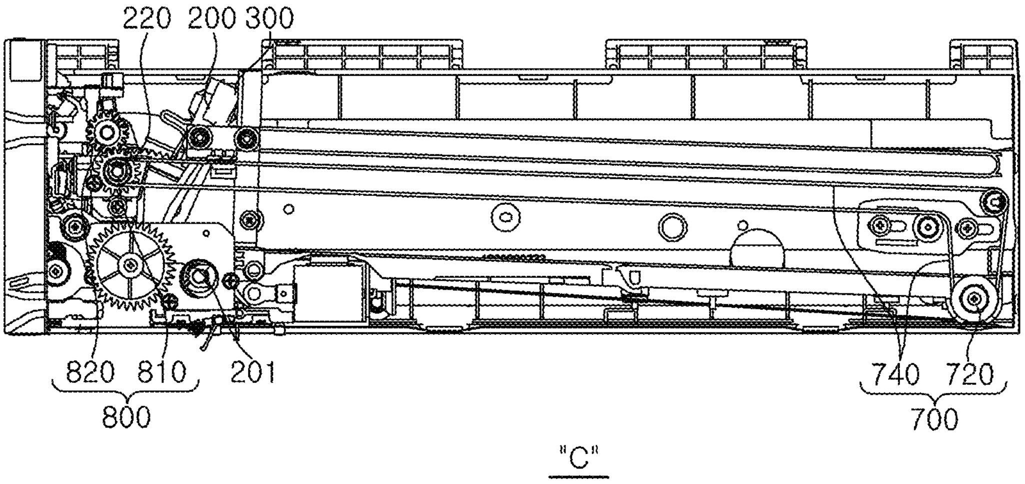
FIG. 5 is an enlarged cross-sectional side view of part "C" of FIG. 2.
Figure 6:
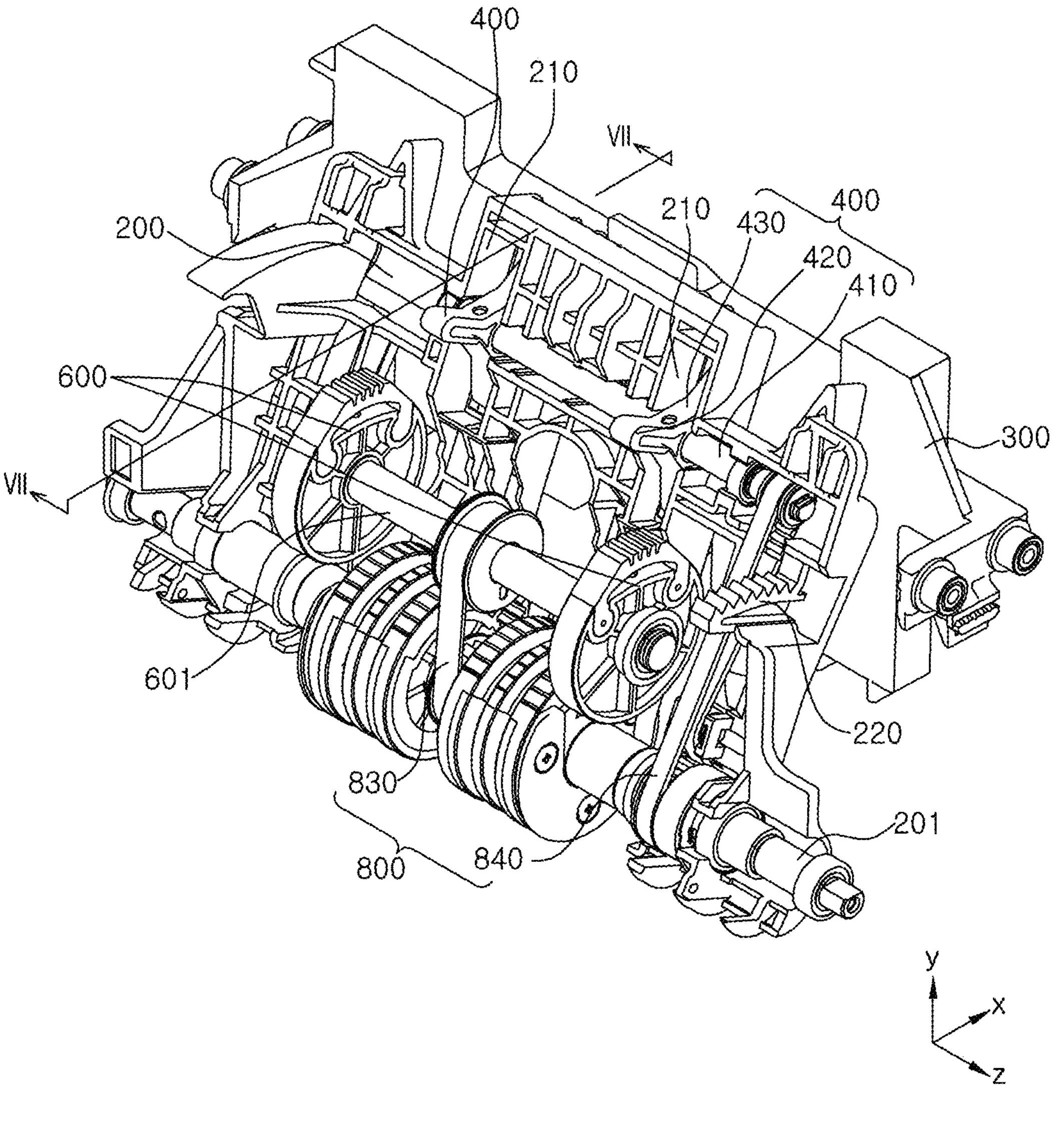
FIG. 6 is a perspective view showing the arrangement of a front plate and a push plate of the cassette according to one embodiment of the present disclosure.
Figure 7:
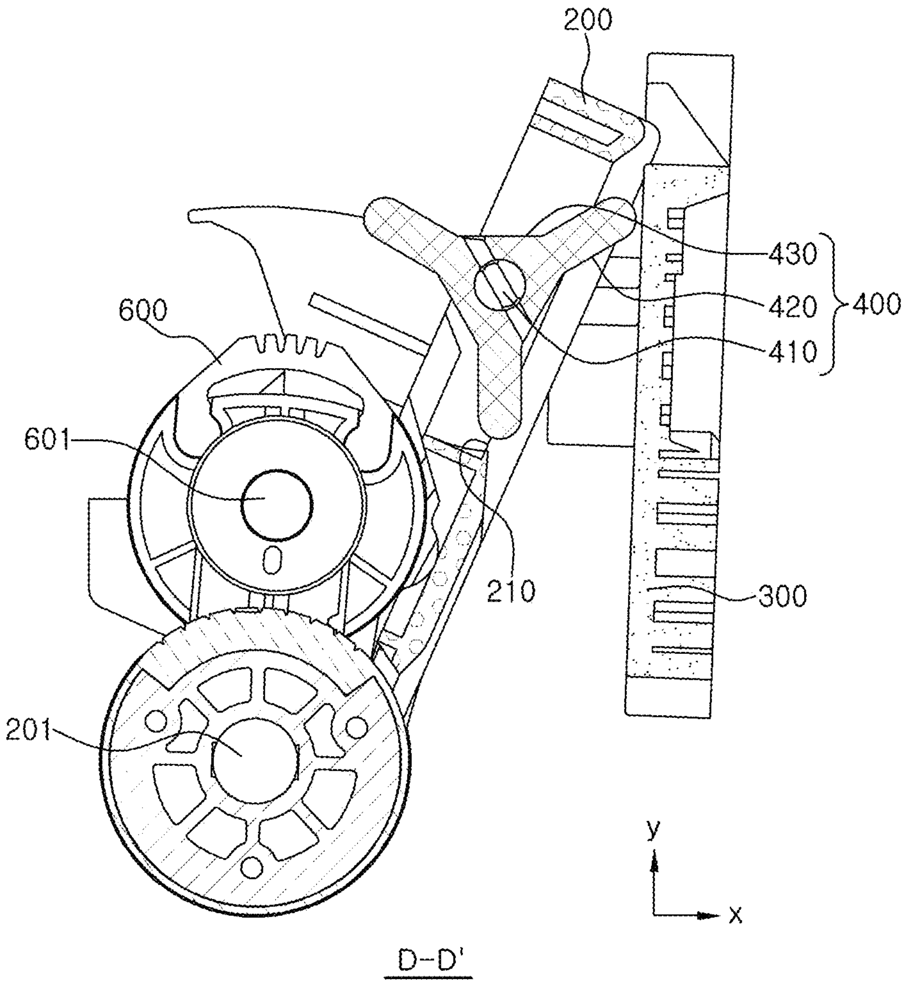
FIG. 7 is a cross-sectional view taken along line VII-VII of FIG. 6.
Figure 8:
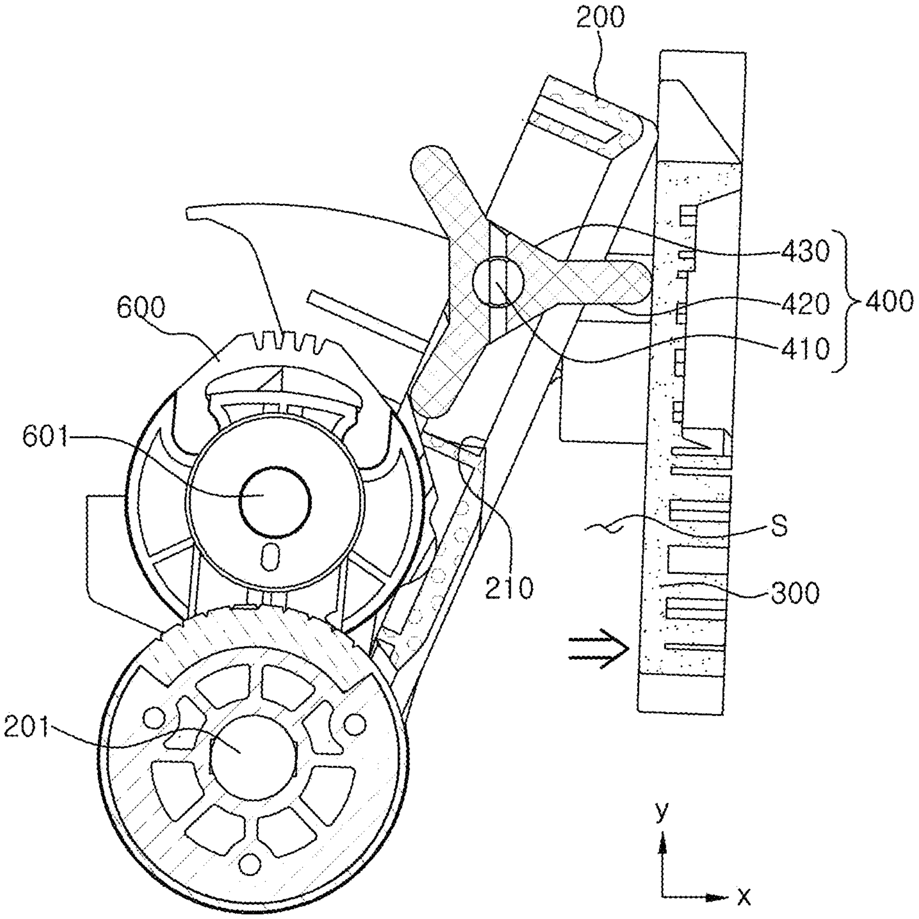
FIG. 8 is a state diagram showing the state in which a stack space is formed between the front plate and the push plate by the rotation of a stack wheel in the cassette of FIG. 7.

Referring to FIG. 1, an automated teller machine 1 according to the present disclosure can stably stack mediums in a cassette 60 when the cassette 60 is disposed horizontally. The automated teller machine 1 may include a main body 10, a deposit and withdrawal unit 20, a discrimination unit 30, a temporary holding unit 40, a conveyance path 50, a cassette 60, a controller 70, and a detection sensor 80.

The main body 10 may include a frame/housing that provides the overall appearance of the automated teller machine 1. The main body 10 may be divided into an upper body 11 and a lower body 12. The deposit and withdrawal unit 20, the discrimination unit 30, and the temporary holding unit 40 may be arranged in the upper body 11. The lower body 12 may be a safe that provides a space in which mediums can be stored. The cassette 60 may be disposed horizontally in the lower body 12.

The deposit and withdrawal unit 20 may provide a space for depositing and withdrawing mediums. The deposit and withdrawal unit 20 may be placed in the upper body 11. The deposit and withdrawal unit 20 can be connected to the discrimination unit 30, the temporary holding unit 40, and the cassette 60 through the conveyance path 50. When medium is inserted (deposited) into the deposit and withdrawal unit 20, the deposit and withdrawal unit 20 can transfer the deposited medium to the discrimination unit 30 through the conveyance path 50. When medium is dispensed (withdrawn) through the deposit and withdrawal unit 20, the deposit and withdrawal unit 20 can receive the medium to be dispensed from the cassette 60 through the conveyance path 50.

The discrimination unit 30 may recognize the medium as either a normal note or a rejected note by identifying the presence or absence of an abnormality in the medium moving along the conveyance path 50. The normal note may be a medium to be normally deposited into the automated teller machine 1. The rejected note is an abnormal note, and may be a damaged or counterfeit banknote or a paper that is not a banknote. For example, the rejected note may be a torn banknote, a counterfeit banknote, or a receipt, and the rejected note may be a normal note that has been damaged while moving along the conveyance path 50.

The temporary holding unit 40 can be used for the purpose of temporarily storing medium. The temporary holding unit 40 may be disposed in the upper body 11. The temporary holding unit 40 may be connected to the deposit and withdrawal unit 20 through the conveyance path 50. The normal or rejected notes discriminated by the discrimination unit 30 may be temporarily stored in the temporary holding unit 40. The temporary holding unit 40 may be configured in a drum-like structure.

The conveyance path 50 can transfer mediums between the deposit and withdrawal unit 20, the discrimination unit 30, the temporary holding unit 40, and the cassette 60. The conveyance path 50 may include a driving roller, a driven roller, and a switching gate for transferring the mediums. The conveyance path 50 may be driven by a motor and controlled by the controller 70.

Referring to FIGS. 2 to 8, the cassette for the automated teller machine according to the present disclosure may be provided in the form of a storage box capable of storing mediums. The mediums stored in the cassette 60 can be dispensed through the deposit and withdrawal unit 20 when there is a request for recovery or withdrawal from a customer. For example, the cassette 60 may be a recycle cassette (RC) module. A plurality of cassettes 60 may be provided in multiple pieces that are detachably disposed in a horizontal direction within the main body 10. The plurality of cassettes 60 may be arranged to be stacked in an upper and lower direction of the main body. The plurality of cassettes 60 may store mediums by separating them by note type. The cassette 60 according to one embodiment of the present disclosure may include a case 100, a front plate 200, a push plate 300, a stack wheel 400, a sheet roller 500, a pick-up roller 600, a moving assembly 700, and a power transmission assembly 800.

The case 100 may provide an accommodation space 101 in which mediums can be stored. The front plate 200, the push plate 300, the stack wheel 400, and the sheet roller 500 may be disposed in the storage space 101. The case 100 may include a lower case 110 forming the accommodation space 101, and an upper case 120 that opens and closes the accommodation space 101.

The front plate 200 can guide medium received through the conveyance path 50 to be stacked in the accommodation space 101 of the case 100. The front plate 200 may provide a stack space S for stack of medium in a space between the front plate 200 and the push plate 300. The front plate 200 may be rotatably arranged in the case 100. For example, one end of the front plate 200 may be rotatably connected to the case 100 through a front rotation shaft 201. The front plate 200 may be provided with a front groove 210 and a front gear 220.

The front groove 210 may provide a space in which the stack wheel 400 can rotate. The front groove 210 may be formed through the other end portion of the front plate 200. The stack wheel 400 may be rotatably disposed in the front groove 210. When the stack wheel 400 rotates, at least a portion of the stack wheel 400, that is, a wheel push portion 420 of the stack wheel 400, can selectively protrude from the front groove 210.

The front gear 220 may be provided in the form of a gear provided on the front plate 200. The front gear 220 can be selectively coupled to the power transmission assembly 800 to rotate the front plate 200. When the push plate 300 presses the front plate 200, the front gear 220 can engage with a sub power transmission gear 820 of the power transmission assembly 800. When the front gear 220 engages with the sub power transmission gear 820 of the power transmission assembly 800, the front gear 220 can receive power from the power transmission assembly 800. In other words, when the front gear 220 is engaged with the sub power transmission gear 820 of the power transmission assembly 800, and the sub power transmission gear 820 of the power transmission assembly 800 is rotated, the front gear 220 can be moved relative to the direction in which the sub power transmission gear 820 rotates by the rotational force of the sub power transmission gear 820. As a result, the front plate 200 can be rotated in the case 100 through the front rotation shaft 201.

The push plate 300 can guide medium received through the conveyance path 50 together with the front plate 200 to be stacked in the accommodation space 101 of the case 100. The push plate 300 may provide the stack space S for stack of medium in the space between the push plate 300 and the front plate 200. The push plate 300 may be disposed to be horizontally movable in the accommodation space 101 toward or away from the front plate 200.

The stack wheel 400 may selectively protrude from the front groove 210 of the front plate 200. The stack wheel 400 may be rotatably disposed in the front groove 210 of the front plate 200. When the stack wheel 400 protrudes from the front groove 210 by rotation, the stack wheel 400 can provide the stack space S for stack of medium between the front plate 200 and the push plate 300. The rotation of the stack wheel 400 may be linked with the rotation of the sheet roller 500. A rotation shaft of the stack wheel 400 is drivingly connected to a rotation shaft of the sheet roller 500 through the front rotation shaft 201, so that the stack wheel 400 can be linked with the sheet roller 500. For example, the rotation shaft of the stack wheel 400 may be drivingly connected to the rotation shaft of the sheet roller 500 such that when the sheet roller 500 rotates in one direction, the stack wheel 400 rotates in a direction opposite to the rotation direction of the sheet roller 500. The stack wheel 400 may include a wheel shaft portion 410, a wheel push portion 420, and a wheel groove portion 430.

The wheel shaft portion 410 may be disposed at an end of the front plate 200 to be rotatable in the front groove 210 of the front plate 200. A plurality of sets of wheel push portion 420 may be arranged to be spaced apart in a longitudinal direction on the wheel shaft portion 410. In the present embodiment, two sets of wheel push portions 420 may be formed to be spaced apart on the wheel shaft portion 410.

The wheel push portion 420 may be formed to protrude from an outer circumferential surface of the wheel shaft portion 410. A plurality of wheel push portions 420 may be provided to be spaced apart at regular intervals in the circumferential direction on the outer circumferential surface of the wheel shaft portion 410. In the present embodiment, three wheel push portions 420 may be provided to be spaced apart at 120-degree intervals in the circumferential direction of the wheel shaft portion 410.

The wheel groove portion 430 may be formed between the plurality of wheel push portions 420. When the wheel groove portion 430 is positioned parallel to the front plate 200, the stack wheel 400 may be in a non-protruding state that is not exposed on one side of the front plate 200.

The sheet roller 500 may be rotatably disposed on the front plate 200 to guide the medium into the accommodation space 101. The sheet roller 500 may include a plurality of wing-shaped elastic sheets. When the medium is brought into the stack space S, the sheet roller 500 may strike a rear end of the medium to stack the medium into the stack space. A roller rotation shaft 501 of the sheet roller 500 may be drivingly connected to the front rotation shaft 201 of the front plate 200.

The pickup roller 600 can facilitate separation of individual sheets of mediums. The pickup roller 600 may be rotatably disposed on the front plate 200. The medium separated by the pickup roller 600 may be taken out of the case 100 and transferred to the conveyance path 50. The stack wheel 400 may rotate in conjunction with the rotation of the sheet roller 500. A pickup shaft 601 of the pickup roller 600 may be drivingly connected to the front rotation shaft 201 of the front plate 200.

The moving assembly 700 can move the push plate 300 horizontally within the case 100. When the cassette 60 is mounted horizontally in the main body 10, the moving assembly 700 can receive driving force from the main body 10 and transmit it to the push plate 300. The moving assembly 700 may include a moving gear 710, a moving shaft 720, a moving belt 730, a sub driving belt 740, and a main driving belt 750.

The moving gear 710 may be an intermediate gear that can receive driving force from the main body 10. When the cassette 60 is mounted in the main body 10, the moving gear 710 can receive driving force from a driving gear disposed in the main body 10 by engaging with the driving gear in the main body 10. The moving gear 710 may be disposed in a side portion of the case 100.

The moving shaft 720 can receive driving force from the moving gear 710 and transmit it to the moving belt 730 and the sub driving belt 740. The moving shaft 720 may be disposed at an end portion of the support plate 111 to extend in a width direction (z direction) of the case 110. A part of the moving shaft 720 may be drivingly connected to the moving gear 710, and another part of the moving shaft 720 may be drivingly connected to the sub driving belt 740. For example, an end of the moving shaft 720 may be drivingly connected to the moving gear 710 and the main driving belt 750, and the other end of the moving shaft 720 may be drivingly connected to the sub driving belt 740. In addition, the moving shaft 720 may be drivingly connected to the moving belt 730. The moving shaft 720 can provide driving force to the push plate 300 through the moving belt 730.

The moving belt 730 can receive driving force from the moving shaft 720 and move the push plate 300 in the horizontal direction. The moving belt 730 may be disposed to surround the support plate 111 of the case 100 in a loop shape. The push plate 300 may be fixed to at least a portion of the moving belt 730. When the moving belt 730 receives driving force from the moving shaft 720, the push plate 300 can move in the horizontal direction (x direction or −x direction) on the support plate 111.

The sub driving belt 740 can receive driving power from the moving shaft 720 and transmit it to the main power transmission gear 810 of the power transmission assembly 800. The sub driving belt 740 may be drivingly connected between the moving shaft 720 and the main power transmission gear 810 of the power transmission assembly 800. When the sub driving belt 740 is rotated by the moving shaft 720, the sub driving belt 740 can rotate the main power transmission gear 810 of the power transmission assembly 800.

The main driving belt 750 can receive driving power from the moving gear 710 and transmit it to the moving shaft 720. The main driving belt 750 may be drivingly connected between the moving gear 710 and the moving shaft 720. When the moving gear 710 rotates, the main driving belt 750 can rotate the moving shaft 720.

The power transmission assembly 800 can selectively transmit the driving force of the moving assembly 700 to the front gear 220 of the front plate 200. The power transmission assembly 800 can be selectively connected to the moving assembly 700 according to the rotation of the front plate 200. For example, when the push plate 300 is moved in the −x direction of FIGS. 5 and 6, and the front plate 200 is rotated toward the sub power transmission gear 820 of the power transmission assembly 800 by the pressing of the push plate 300, the sub power transmission gear 820 of the power transmission assembly 800 can engage with the front gear 220 of the front plate 200, and when the sub power transmission gear 820 of the power transmission assembly 800 and the front gear 220 of the front plate 200 are engaged, the power transmission assembly 800 can transmit the driving force of the moving assembly 700 to the front gear 220 of the front plate 200. The power transmission assembly 800 may include a main power transmission gear 810, a sub power transmission gear 820, a main power transmission belt 830, and a sub power transmission belt 840.

The main power transmission gear 810 can transmit the driving force of the moving assembly 700 to the sub power transmission gear 820. The main power transmission gear 810 may be drivingly connected to the sub driving belt 740 of the moving assembly 700. When the sub driving belt 740 of the moving assembly 700 rotates, the main power transmission gear 810 may rotate in conjunction with the rotation of the sub driving belt 740 to rotate the sub power transmission gear 820.

The sub power transmission gear 820 can selectively transmit the driving force of the main power transmission gear 810 to the front gear 220 of the front plate 200. The sub power transmission gear 820 may be drivingly connected to the main power transmission gear 810, and when it engages with the front gear 220, it can provide the driving force of the main power transmission gear 810 to the front gear 220. In particular, when the sub power transmission gear 820 engages with the front gear 220, the sub power transmission gear 820 can rotate the front plate 200 to move faster than the push plate 300. When the front plate 200 moves faster than the push plate 300, a separation space for separation of the medium can be formed between the front plate 200 and the push plate 300.

The second power transmission belt 840 can transmit the rotational force of the front plate 200 to the stack wheel 400. The second power transmission belt 840 may be drivingly connected between the front rotation shaft 201 of the front plate 200 and the wheel shaft portion 410 of the stack wheel 400. When the second power transmission belt 840 is rotated by the front rotation shaft 201, the second power transmission belt 840 can rotate the wheel shaft portion 410 of the stack wheel 400.

The first power transmission belt 830 can transmit the rotational force of the front plate 200 to the pickup shaft 601. The first power transmission belt 830 may be drivingly connected between the front rotation shaft 201 of the front plate 200 and the pickup shaft 601. When the first power transmission belt 830 is rotated by the front rotation shaft 201, the first power transmission belt 830 can rotate the front rotation shaft 201 and the pickup shaft 601.

Figure 9:
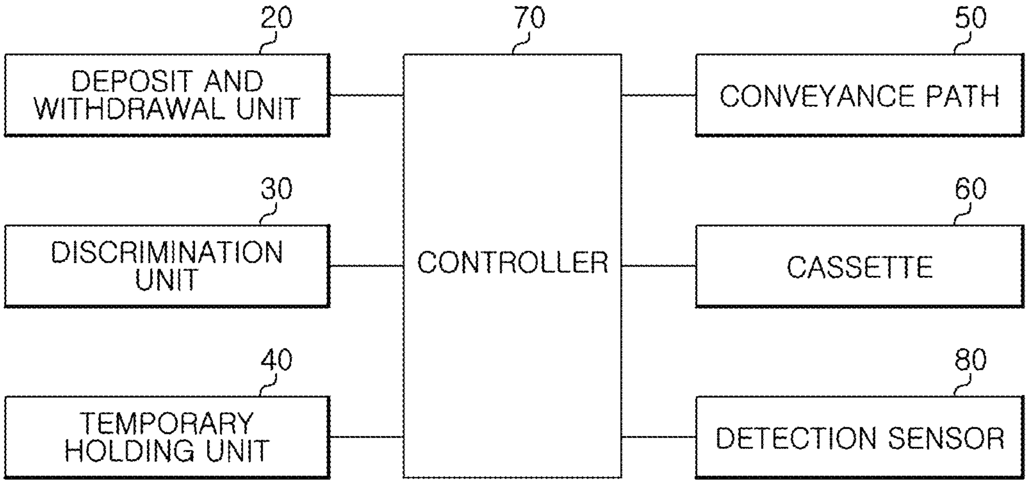
FIG. 9 is a block diagram showing the control logic of the automated teller machine according to one embodiment of the present disclosure.

Referring to FIG. 9, the controller 70 may control the overall operation of the deposit and withdrawal unit 20, the discrimination unit 30, the temporary holding unit 40, the conveyance path 50, and the cassette 60. In particular, when a medium is stacked in the accommodation space 101 of the cassette 60, the controller 70 may control the rotation of the stack wheel 400 of the cassette 60. For example, when a medium is removed from the accommodation space 101 of the case 100, the controller 70 may rotate the wheel shaft portion 410 of the stack wheel 400 so that the stack wheel 400 does not protrude from the push plate 300. When the stack wheel 400 does not protrude from the push plate 300, when the medium is removed from the accommodation space 101 of the case 100, interference between the medium and the stack wheel 400 protruding from the push plate 300 can be prevented.

In addition, the controller 70 may control the rotation of the stack wheel 400 so that the stack wheel 400 selectively retracts from the push plate 300 based on a separation pressure applied by the pickup roller 600 on the medium. The controller 70 may receive information about the separation pressure of the medium by the pickup roller 600 from the detection sensor 80. For example, when removing a medium from the accommodation space 101, the controller 70 may determine whether separation of the medium in the accommodation space 101 is possible based on the information about the separation pressure provided from the detection sensor 80. When it is determined that separation of the medium is not possible based on the separation pressure of the medium by the pickup roller 600, the controller 70 may move the push plate 300 in one direction (x direction in the drawing) away from the front plate 200 and then move it in the other direction (−x direction in the drawing) toward the front plate 200, and control the rotation of the stack wheel 400 so that the stack wheel 400 does not protrude from the push plate 300. The controller 70 may be implemented by a computing device including a microprocessor, a memory, and the like, and since the implementation method is obvious to those skilled in the art, a detailed description thereof will be omitted.

The detection sensor 80 may be a type of sensor capable of detecting the separation pressure applied by the pickup roller 600 on a medium. When the medium is to be removed from the accommodation space, the detection sensor 80 may detect the separation pressure of the medium by the pickup roller 600 and provide information on the detected separation pressure to the controller 70.

As described above, according to the present disclosure, when a medium is stacked horizontally, it is possible to prevent the medium from being stacked in a bulged or crumpled state by forming the stack space between the front plate and the push plate of the cassette, which ultimately enables the medium to be stably stacked within the cassette.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A cassette for an automated teller machine, comprising:

a case providing an accommodation space for a medium;

a front plate rotatably disposed in the case to guide the medium into the accommodation space, the front plate having a front groove;

a push plate disposed horizontally movable in the accommodation space toward or away from the front plate;

a stack wheel rotatably disposed on the front plate so that at least a portion thereof selectively protrudes from the front groove; and a sheet roller rotatably disposed in the case to guide the medium into the accommodation space, wherein when the medium is stacked in the accommodation space, the stack wheel rotates to protrude from the front groove, and wherein a rotation shaft of the stack wheel is drivingly connected to a rotation shaft of the sheet roller so that when the sheet roller rotates in one direction, the stack wheel rotates in a direction opposite to the rotation direction of the sheet roller.

2. The cassette of claim 1, wherein the stack wheel is rotated to retract from the push plate when the medium is removed from the accommodation space.

3. The cassette of claim 1, wherein the stack wheel provides a stack space for stack of the medium between the front plate and the push plate when at least a portion of the stack wheel protrudes from the front groove by rotation.

4. The cassette of claim 1, wherein the stack wheel includes:

a wheel shaft portion disposed on the front plate to be rotatable in the front groove; and a plurality of wheel push portions protruding from an outer circumferential surface of the wheel shaft portion, the wheel push portions being spaced apart at regular intervals in a circumferential direction on the outer circumferential surface of the wheel shaft portion.

5. A cassette for an automated teller machine, comprising:

a case providing an accommodation space for a medium;

a front plate rotatably disposed in the case to guide the medium into the accommodation space, the front plate having a front groove;

a push plate disposed horizontally movable in the accommodation space toward or away from the front plate;

a stack wheel rotatably disposed on the front plate so that at least a portion thereof selectively protrudes from the front groove, wherein when the medium is stacked in the accommodation space, the stack wheel rotates to protrude from the front groove;

a detection sensor for detecting a separation pressure applied by a pickup roller on the medium when the medium is to be removed from the accommodation space;

a moving assembly for horizontally moving the push plate; and a power transmission assembly for transmitting a driving force of the moving assembly to the stack wheel when the push plate presses the front plate.

6. The cassette of claim 5, wherein the moving assembly includes:

a moving gear disposed in a side portion of the case to be engaged with a driving gear disposed in the automated teller machine when the cassette is mounted in the automated teller machine;

a moving shaft drivingly connected to the moving gear to receive driving force from the moving gear;

a main driving belt that transmits driving force of the moving shaft to the push plate to allow the push plate to move horizontally; and a sub driving belt that transmits the driving force of the moving shaft to the power transmission assembly.

7. The cassette of claim 6, wherein the front plate is provided with a front gear that is selectively and drivingly connected to the power transmission assembly when the push plate presses the front plate.

8. The cassette of claim 7, wherein the power transmission assembly includes:

a main power transmission gear drivingly connected to the sub driving belt; and a sub power transmission gear drivingly connected to the main power transmission gear and selectively engageable with the front gear, and wherein when engaged with the front gear, the sub power transmission gear rotates the front plate to move faster than the push plate to provide a separation space for separation of the medium between the front plate and the push plate.

* * * * *